United States Patent [19]

Mashimo et al.

[11] Patent Number: 4,776,828
[45] Date of Patent: Oct. 11, 1988

[54] POWER TRANSMISSION BELT

[75] Inventors: Satoshi Mashimo, Akashi; Hajime Kakiuchi, Itami; Masayoshi Nakajima, Kobe, all of Japan

[73] Assignee: Mitsuboshi Belting Ltd., Kobe, Japan

[21] Appl. No.: 108,054

[22] Filed: Oct. 13, 1987

Related U.S. Application Data

[63] Continuation of Ser. No. 315,453, Oct. 17, 1981, abandoned.

[30] Foreign Application Priority Data

Oct. 28, 1980 [JP] Japan ................... 55-151870

[51] Int. Cl.$^4$ ............................................. F16G 5/04
[52] U.S. Cl. ................................... 474/205; 474/260; 474/261; 524/261; 524/271
[58] Field of Search ............... 474/205, 250, 251, 264, 474/260, 261; 524/261, 262, 271, 280

[56] References Cited

U.S. PATENT DOCUMENTS

| | | | |
|---|---|---|---|
| 2,802,511 | 8/1957 | Waugh | 474/250 |
| 3,350,345 | 10/1967 | Vanderbilt et al. | 260/41.5 |
| 3,479,892 | 11/1969 | Gigognani | 474/254 |
| 3,957,718 | 5/1976 | Pochert et al. | 260/38 |
| 4,011,766 | 3/1977 | Waugh | 74/234 |
| 4,024,773 | 5/1977 | Hartman et al. | 74/233 |
| 4,034,615 | 7/1977 | Brooks | 74/229 |
| 4,188,832 | 2/1980 | Henderson | 474/250 |
| 4,244,234 | 1/1981 | Standley | 474/264 |

FOREIGN PATENT DOCUMENTS

| | | | |
|---|---|---|---|
| 73241 | 12/1981 | Japan | 474/205 |
| 1404250 | 8/1975 | United Kingdom | 474/205 |
| 1439247 | 6/1976 | United Kingdom | . |
| 1438355 | 6/1976 | United Kingdom | . |
| 1524077 | 9/1978 | United Kingdom | . |
| 2038341 | 7/1980 | United Kingdom | . |

Primary Examiner—Thuy M. Bui
Attorney, Agent, or Firm—Wood, Dalton, Phillips, Mason & Rowe

[57] ABSTRACT

A toothed power transmission belt (10) is manufactured by an improved method to have substantially improved resistance to tooth root face cracking. The manufacture utilizes a modified rubber blend forming the teeth (15) and may utilize the same blend for embedding the load-carrying cords (14) to provide improved bonding of the teeth (15) to the cords (14) over a wide range of temperatures.

12 Claims, 1 Drawing Sheet

POWER TRANSMISSION BELT

This is a continuation of application Ser. No. 315,453, filed Oct. 17, 1981, now abandoned.

BACKGROUND OF THE INVENTION
1. Field of the Invention

This invention relates to power transmission belts and in particular to cogged, or toothed, transmission belts.

2. Description of the Background Art

One conventional form of power transmission belt comprises a cog belt wherein a plurality of teeth project from the body portion of the belt for engagement with suitable pulley teeth in providing a positive drive in the manner of a conventional chain drive.

A serious problem arises in the conventional cog belts of the prior art in that the belts tend to crack at the junction of the tooth with the body of the belt in normal use of the belt. More specifically, the cracks form at the root face of the teeth. Such root face cracking is highly undesirable as it shortens the life of the belt.

One attempted solution to the root face cracking problem has been to provide fabric on the face of the belt defining the teeth.

In one conventional form, the cog belt is formed of a rubber blend. Tensile strength is provided in the belt by means of a plurality of longitudinally extending tensile cords embedded in a portion of the rubber outwardly of the teeth. Conventionally, the cords are provided in a layer of the belt comprising a cushion layer. It is desirable to provide a strong bond between the cords and the cushion layer rubber and to provide a strong bond between the cushion layer rubber and the material forming the teeth of the cog belt.

It is known to form modified rubber blends including in the rubber silane coupling agents, silica, and carbon black. Such blends have been used to provide improved characteristics in rubber structures, such as tires and the like.

Illustrative of prior art patents illustrating such modified rubber blends are British Patent Nos. 1,438,355, 1,439,247, 1,524,077 and 2,038,341, and U.S. Pat. Nos. 3,350,345 and 3,957,718.

Two conventional forms of cog belts are illustrated in U.S. Pat. No. 4,011,766 and 4,034,615.

Another attempted solution to preventing root face cracking in such cog belts has been to use conventional carbon black material, such as ISAF and SAF carbon black materials in the tooth rubber. Such formulated rubbers, however, have not been found to satisfactorily solve the problem because the strength of the rubber is substantially decreased at elevated temperatures, as may occur from high ambient temperatures and from the heat generated during the operation of the belt.

Root face cracking is also found to occur in prior art belts as a result of the impositive bond of the tooth rubber through the load-carrying section rubber to the tensile cords.

SUMMARY OF THE INVENTION

The present invention comprehends an improved power transmission belt and method of manufacturing the same providing high resistance to such root face cracking as has occurred in the prior art belts More specifically, the invention comprehends the provision in a power transmission belt having a load-carrying section having longitudinally extending load-carrying cords embedded therein, of a plurality of transverse, longitudinally spaced teeth formed of a modified rubber blend providing high resistance to root face cracking in use, the modified rubber blend comprising about 100 parts by weight rubber, about 0.2 to 5.0 phr silane coupling agent, about 10 to 60 phr silica, and about 2 to 60 phr carbon black.

The invention comprehends forming the belt load-carrying section also of the improved modified rubber blend.

In the illustrated embodiment, the loadcarrying section and teeth are formed as a monolithic structure.

The teeth may be provided with a fabric cover of conventional construction.

The invention comprehends the improved method of forming such a power transmission belt utilizing the improved modified rubber blend, as discussed above.

Thus, the power transmission belt and manufacture thereof are extremely simple and economical while yet providing a highly improved cog belt manufacture having high resistance to root face cracking.

BRIEF DESCRIPTION OF THE DRAWING

Other features and advantages of the invention will be apparent from the following description taken in connection with the accompanying drawing wherein.

DESCRIPTION OF THE PREFERRED EMBODIMENT

Figure 1:
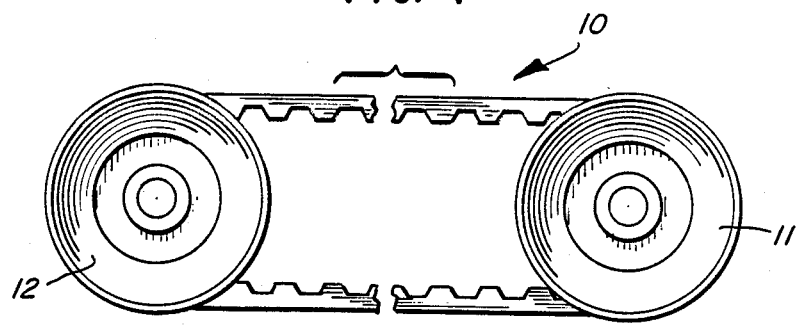
FIG. 1 is a fragmentary side elevation of a power transmission system utilizing a power transmission belt embodying the invention.

In the exemplary embodiment of the invention as disclosed in the drawing, a power transmission belt generally designated 10 is shown to comprise a cog, or toothed, belt adapted to be driven by a toothed pulley 11 and drive a complementary toothed pulley 12.

Figure 2:
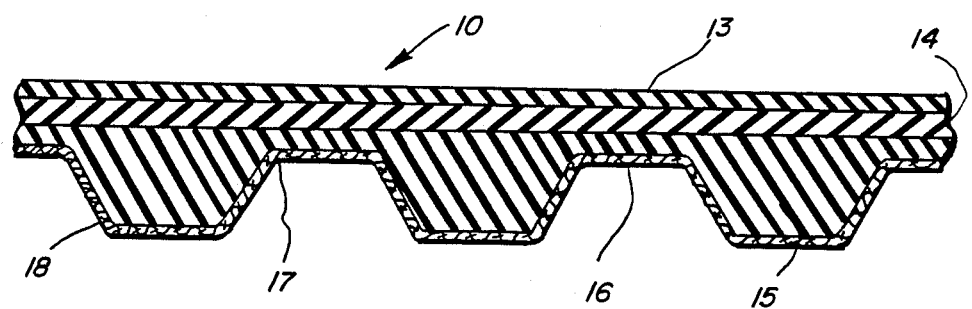
FIG. 2 is a fragmentary longitudinal section of the power transmission belt of the invention.

As seen in FIG. 2, the belt defines a longitudinally extending, outer load-carrying section 13 having embedded therein a plurality of longitudinally extending tensile cords 14. Belt 10 further defines a plurality of transversely extending longitudinally spaced teeth, or cogs, 15. As shown, the cogs are spaced longitudinally by lands 16. The lands define the root face of the belt.

In the illustrated embodiment, the root face and teeth are joined to the load-carrying section monolithically, as at 17.

A cover fabric 18 may be provided on the bottom surface of the teeth and root faces.

The invention comprehends forming the belt 10 of a modified rubber blend, and in particular, the forming of the cog teeth of the improved modified rubber blend so as to have improved bonding to tensile cords 14 for extended belt life. The use of the improved modified rubber blend further provides improved strength in the cog teeth, providing further improved extended belt life. More specifically, the invention comprehends the method of forming such a belt by forming the teeth of a modified rubber blend including a silane coupling agent, silica, and carbon black. Further, the invention comprehends forming the cushion, or load-carrying section 13 in which the tensile cores are embedded similarly of the improved modified rubber blend so as to provide improved bond strength between the teeth and the tensile cords.

It has been found that a modified rubber blend formulated of 100 parts by weight of rubber, 0.2 to 5.0 phr parts per hundred parts rubber silane coupling agent, 10 to 60 phr silica, and 2 to 60 phr carbon black provides a substantially improved belt onstruction providing high resistance to cracking.

The use of the silane coupling agent in the disclosed range provides an improved reinforcing of the rubber without early vulcanization defined by a short scorch time. Such vulcanization prevention is particularly desirable where the rubber comprises chloroprene rubber.

It is desirable to maintain the silica in the indicated range so as to provide the desirable adhesive and tear strength characteristic without excessively raising the Mooney viscosity so as to avoid faulty tooth molding and the like.

It is desirable to maintain the carbon black in the indicated range so as to provide the desirable reinforcing effect while again maintaining the Mooney viscosity suitably to prevent molding problems and shortened useful life.

It has been found that the use of the improved modified rubber blend provides a long, troublefree life to the belt.

Examples of suitable silane coupling agents include Vinyl-Tris ($\beta$-Methoxy Ethoxy) Silane, N-$\beta$-(Aminoethyl)$\gamma$-Aminopropyltrimethoxy Silane, $\gamma$-Mercaptopropyltrimethoxy Silane, $\gamma$-Glysidoxypropyltrimethoxy Silane, Bis-(3-[Tri-ethoxisilyl]-Propyl-) Tetrasulfane, etc.

Titanium coupling agents may be provided in lieu of the silane coupling agents.

The rubber may comprise any suitable rubber, including chloroprene rubber, styrene butadiene rubber, natural rubber, etc. As will be obvious to those skilled in the art, the rubbers may further include additives, such as softeners, antioxidants, processing agents, tackifiers, accelerators, sulfurs, etc.

The formation of the rubber blend may be effected by conventional mixing steps, such as by using Banbury mixers, kneaders, calender rolls, etc. The silica may be kneaded with the silane coupling agent by means of a kneader.

The invention comprehends the forming of the belt with the improved modified rubber blend in the tooth portion only as well as for each of the load-carrying and tooth sections Where the improved rubber blend is utilized in the load-carrying section, improved bond strength between the load-carrying rubber and the tensile cords is obtained.

It has been found that the improved belt manufacture utilizing the modified rubber blend hereof may be effected with other steps in the manufacturing process being of conventional characteristics.

EXAMPLE I 100 parts of chloroprene rubber was blended with 2 phr stearic acid, 4 phr magnesium oxide, 3 phr antioxidant, 5 phr process oil, 15 phr HAF carbon black, 30 phr silica, 1 phr silane coupling agent ($\gamma$-Mercaptopropyltrimethoxy Silane), 5 phr zinc oxide, and 0.5 NA-22.

The materials were kneaded in a Banbury mixer and vulcanized under conventional vulcanizing conditions at 150° C. for 30 minutes.

The physical properties of the vulcanized modified rubber blend were as follows:

| | | |
|---|---|---|
| Hardness (JIS-A) | 72 | at 25° C. |
| 25% modulus (kg/cm$^2$) | 13.5 | at 25° C. |
| Tensile strength (kg/cm$^2$) | 208 | at 25° C. |
| Elongation (%) | 460 | at 25° C. |
| Tear strength (JIS-A) | 72 | at 25° C. |
| Hardness (JIS-A) | 71 | at 90° C. |
| 25% modulus (kg/cm$^2$) | 12.5(−7) | at 90° C. |
| Tear strength (MIS-A) | 44(−39) | at 90° C. |

NOTE:
Numerals in parentheses indicate Rate of Change.

The modified rubber blend was utilized in forming a cog belt of the L-type, having the teeth 15 at 9.525 mm pitch, 31.5" length, and 0.75" width. The tensile cords were composed of glass fiber ropes. The belts thus manufactured exhibited the following characteristics:

| | |
|---|---|
| Load-carrying cords adhesion test | 68.5 |
| Pulsation test Time duration until root face cracking appears (hrs.) | 96 |
| Running test at 7,200 rpm Time duration until root face cracking appears (hrs.) | 1,520 |
| Time duration until belt life is over (hrs.) | 1,960 |

In conducting the load-carrying cord adhesion test, a determination was made of the force required to pull out two ropes from the belt having a length equal to three teeth thereof. The pulsation test was conducted by applying sine wave pulsation to the belts under an average axial load of 48 kg. In the running test, the drive pulley was an 18-tooth pulley and was driven at 7,200 rpm, the driven pulley was a 36-tooth pulley and placed a 7 hp. load on the belt. A 62mm. diameter hydropulley was used to maintain tension in the belt.

The cog belts of Example I exhibited a reduced modulus variation over the range of 25° to 90° C. as compared with similar belts utilizing carbon black alone in lieu of the disclosed formulation utilizing the silane coupling agent, silica, and carbon black. As indicated above, the cog belts of the present invention provide an improved bonding of the teeth to the load-carrying cords so as to produce an increased useful life of one and onehalf to four times the conventional belts utilizing only the carbon black additive. The improved belts exhibited high strength to root face cracking, which, as indicated above, has been a serious and perplexing problem in the prior art belts.

EXAMPLE II 100 parts of chloroprene rubber was blended with 2 phr stearic acid, 4 phr magnesium oxide, 3 phr antioxidant, 5 phr process oil, 20 phr HAF carbon black, phr silica, 0.8 silane coupling agent ($\gamma$-Mercaptopropyltrimethoxy Silane), 5 phr zinc oxide, and 0.5

The materials were kneaded in a Banbury mixer and vulcanized under conventional vulcanizing conditions at 150° C. for 30 minutes.

The physical properties of the vulcanized modified rubber blend were as follows:

| | | |
|---|---|---|
| Hardness (JIS-A) | 74 | at 25° C. |
| 25% modulus (kg/cm$^2$) | 16.0 | at 25° C. |
| Tensile strength (kg/cm$^2$) | 201 | at 25° C. |
| Elongation (%) | 445 | at 25° C. |
| Tear strength (JIS-A) | 60 | at 25° C. |
| Hardness (JIS-A) | 73 | at 90° C. |

| -continued | |
|---|---|
| 25% modulus (kg/cm$^2$) | 14.6(−9) at 90° C. |
| Tear strength (JIS-A) | 39(−35) at 90° C. |

NOTE:
Numerals in parentheses indicate Rate of Change.

The modified rubber blend was utilized in forming a cog belt of the L-type, having the teeth 15 at 9.525 mm pitch, 31.5" length, and 0.75" width. The tensile cords were composed of glass fiber ropes. The belts thus manufactured exhibited the following characteristics: teristics:

| | |
|---|---|
| Load-carrying cords adhesion test | 63 |
| Pulsation test Time duration until root face cracking appears (hrs) | 123 |
| Running test at 7,200 rpm Time duration until root face cracking appears (hrs) | 1,680 |
| Time duration until belt life is over (hrs) | 2,130 |

In conducting the load-carrying cord adhesion test, a determination was made of the force required to pull out two ropes from the belt having a length equal to three teeth thereof. The pulsation test was conducted by applying sine wave pulsation to the belts under an average axial load of 48 kg. In the running test, the drive pulley was an 18-tooth pulley and was driven at 7,200 rpm, the driven pulley was a 36-tooth pulley and placed a 7 hp. load on the belt. A 62 mm. diameter hydropulley was used to maintain tension in the belt.

The cog belts of Example II exhibited a reduced modulus variation over the range of 25° to 90° C. as compared with similar belts utilizing carbon black alone in lieu of the disclosed formulation utilizing the silane coupling agent, silica, and carbon black. As indicated above, the cog belts of the present invention provide an improved bonding of the teeth to the load-carrying cords so as to produce an increased useful life of one and one-half to four times the conventional belts utilizing only the carbon black additive. The improved belts exhibited high strength to root face cracking, which, as indicated above, has been a serious and perplexing problem in the prior art belts.

The improved characteristics of the blends of Examples I and II are shown with reference to a conventional rubber blend having a similar composition except for the use of 35 phr HAF carbon black instead of the indicated carbon black, silica and silane coupling agent constituents of the above discussed examples. The prior art blend exhibited the following physical properties:

| | |
|---|---|
| Hardness (JIS-A) | 70 at 25° C. |
| 25% modulus (kg/cm$^2$) | 10.8 at 25° C. |
| Tensile strength (kg/cm$^2$) | 240 at 25° C. |
| Elongation (5) | 470 at 25° C. |
| Tear strength (JIS-A) | 52 at 25° C. |
| Hardness (JIS-A) | 68 at 90° C. |
| 25% modulus (kg/cm$^2$) | 9.1(−16) at 90° C. |
| Tear strength (JIS-A) | 27(−48) at 90° C. |

NOTE:
Numerals in parentheses indicate Rate of Change

Thus, the invention broadly comprehends an improved power transmission belt manufacture having high resistance to root face cracking and thereby providing extended useful life of the transmission belt.

More specifically, the improved manufacture comprehends the method of causing a high strength crack resistance in the junction 16 between a plurality of teeth 15 of a cog power transmission belt 10, and the load-carrying cord section 13 thereof, the method comprising forming trhe junction of a modified rubber blend comprising about 100 parts by weight rubber, about 0.2 to 5.0 phr silane coupling agent, about 10 to 60 phr silica, and about 2 to 60 phr carbon black. As further disclosed, the teeteh and load-carrying sections may be formed concurrently.

The foregoing disclosure of specific embodiments is illustrative of the broad inventive concepts comprehended by the invention.

We claim:

1. In a power transmission belt having a load-carrying section having longitudinally extending load-carrying cords therein, and a plurality of transverse, longitudinally spaced pulley-tooth engagement teeth extending from said load-carrying section and defining therebetween land portions forming concave root faces, the improvement comprising the formation of said land portions of a modified rubber blend providing high resistance to root face cracking in use, said modified rubber blend consisting of
   (a) about 100 parts by weight rubber,
   (b) about 0.2 to 5.0 phr silane coupling agent,
   (c) about 10 to 60 phr silica, and
   (d) about 2 to 60 phr carbon black.

2. The toothed power transmission belt of claim 1 wherein said load-carrying section is formed of said rubber blend.

3. The toothed power transmission belt of claim 1 wherein said load-carrying section is also formed of said rubber blend, and said load-carrying section, root face land portion and teeth are formed as a monolithic structure.

4. The toothed power transmission belt of claim 1 wherein said root faces are provided with a fabric cover.

5. The toothed power transmission belt of claim 1 wherein said rubber comprises natural rubber, chloroprene rubber, or styrene butadiene rubber.

6. The toothed power transmission belt of claim 1 wherein the phr of said silane coupling agent is in the range of 0.3 to 3.0.

7. The toothed power transmission belt of claim 1 wherein the phr of said silica is in the range of 20 to 45.

8. The toothed powewr transmission belt of claim 1 wherein the phr of said carbon black is in the range of 10 to 40.

9. The toothed power transmission belt of claim 1 wherein said rubber is chloroprene rubber.

10. The method of causing a high strength crack resistance in the junction between a plurality of pulley-tooth engagement teeth of a cog power transmission belt and the load-carrying cord section thereof, said method comprising the forming said junction of a modified rubber blend consisting of
   (a) about 100 parts by weight rubber,
   (b) about 0.2 to 5.0 phr silane coupling agent,
   (c) about 10 to 60 phr silica, and
   (d) about 2 to 60 phr carbon black.

11. The method of claim 10 including a step of forming the teeth and load-carrying section concurrently.

12. The method of claim 10 wherein said rubber is chloroprene rubber.

* * * * *